United States Patent [19]

Kaito et al.

[11] Patent Number: 5,753,169
[45] Date of Patent: May 19, 1998

[54] METHOD OF AFTER-TREATMENT OF MODIFIED POLYOLEFINS

[75] Inventors: Hiroyoshi Kaito; Kazunori Yano; Akeharu Wakayama; Masahide Ochiumi, all of Yokkaichi, Japan

[73] Assignee: Mitsubishi Chemical Corporation, Tokyo-To, Japan

[21] Appl. No.: 622,602

[22] Filed: Mar. 26, 1996

[30] Foreign Application Priority Data

Mar. 27, 1995 [JP] Japan .................... 7-067987

[51] Int. Cl.⁶ .................... B29C 47/40; C08F 255/00
[52] U.S. Cl. .................... 264/211.19; 264/211.23; 264/211.24
[58] Field of Search .................... 264/211.19, 211.24, 264/211.23, 101, 102; 159/2.2

[56] References Cited

U.S. PATENT DOCUMENTS

| | | | |
|---|---|---|---|
| 3,917,507 | 11/1975 | Skidmore | 159/2.2 |
| 3,925,341 | 12/1975 | Mueller-Tamm et al. | 528/481 |
| 4,369,278 | 1/1983 | Kasahara et al. | 264/102 |
| 4,831,115 | 5/1989 | Golba, Jr. et al. | 528/481 |
| 4,958,006 | 9/1990 | Bernier et al. | 264/211.23 |
| 4,992,222 | 2/1991 | Banevicius et al. | 264/211.23 |
| 5,057,261 | 10/1991 | Ohori et al. | 264/211.19 |
| 5,137,975 | 8/1992 | Kelusky | 264/211.24 |
| 5,380,822 | 1/1995 | Skilbeck | 528/499 |
| 5,565,161 | 10/1996 | Auda et al. | 264/211.24 |

FOREIGN PATENT DOCUMENTS

| | | | |
|---|---|---|---|
| 370735 | 5/1990 | European Pat. Off. | 264/211.23 |
| 0 435 023 | 7/1991 | European Pat. Off. | |
| 0 494 543 | 7/1992 | European Pat. Off. | |
| 0 659 784 | 6/1995 | European Pat. Off. | |
| 0 713 891 | 5/1996 | European Pat. Off. | |
| 56-70931 | 6/1981 | Japan | 264/211.23 |
| 56-118411 | 9/1981 | Japan | |
| 867028 | 5/1961 | United Kingdom | |
| 1 510 261 | 5/1978 | United Kingdom | |
| 95/04091 | 2/1995 | WIPO | |

Primary Examiner—Robert Davis
Attorney, Agent, or Firm—Oblon, Spivak, McClelland, Maier & Neudtadt, P.C.

[57] ABSTRACT

The amount of impurities contained in a modified polyolefin obtained by means of melt-kneading grafting is reduced by melt-kneading the modified polyolefin in the presence of water. A melt-kneading machine having a vent port is typically used in this process.

14 Claims, 1 Drawing Sheet

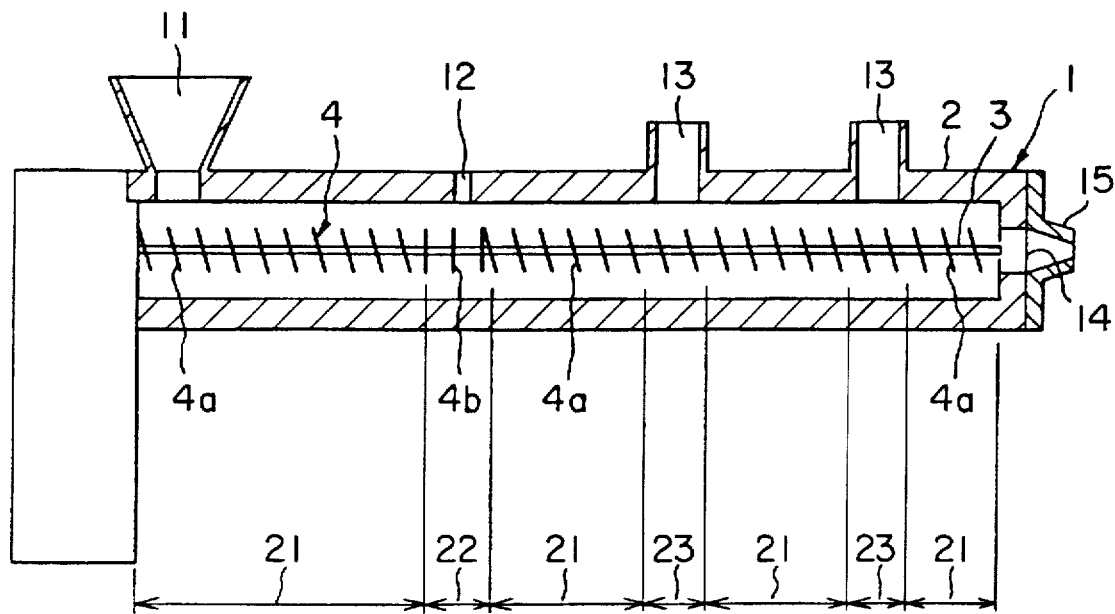
F I G. 1
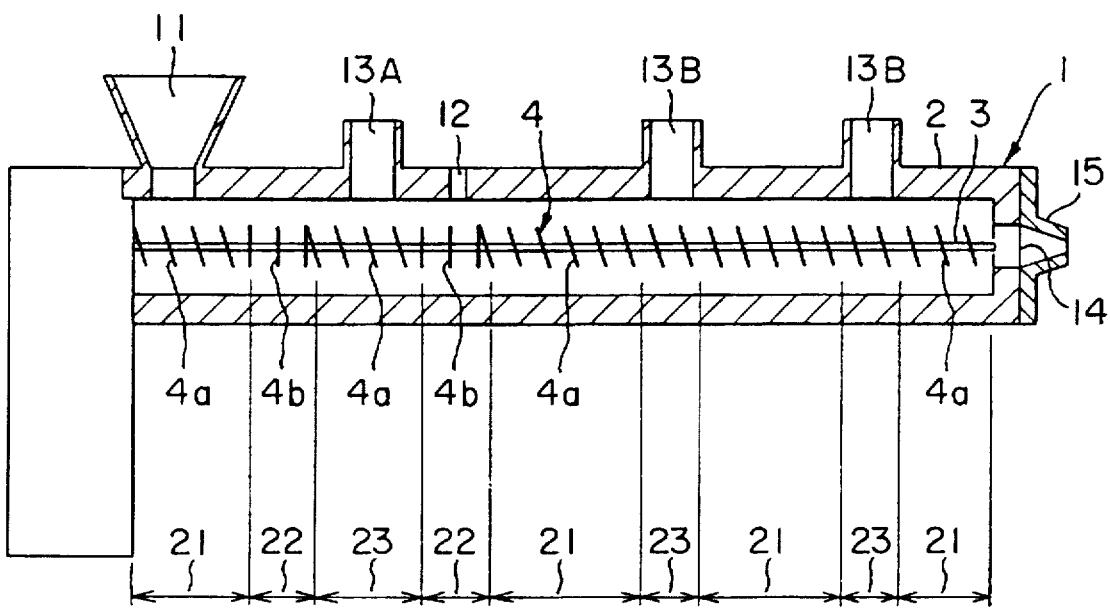
F I G. 2

METHOD OF AFTER-TREATMENT OF MODIFIED POLYOLEFINS

BACKGROUND OF THE INVENTION

1. Field of the Invention

The present invention relates to a method of after-treatment of modified polyolefins. More particularly, the present invention relates to a method of after-treatment of modified polyolefins, useful for economically producing modified polyolefins which are excellent in adhesiveness and which are colored little.

2. Related Art

Polyolefins are relatively inexpensive, and excelent in moldability, heat resistance, solvent resistance, mechanical properties, appearance and the like. Therefore, they are used in various fields as materials for producing a variety of molded products such as films, containers and toys.

However, since polyolefins are essentially consisting of saturated hydrocarbons and poor in chemical reactivity, they have had problems in adhesiveness, coating properties, printability and the like.

There are methods for solving these problems; for example, a method in which a polyolefin is treated by the application of radiation such as electron beam, or of ozone; and a method in which a polyolefin is grafted with an ethylenically unsaturated compound such as a vinyl compound or an unsaturated carboxylic acid in the presence of a radical initiator such as an organic peroxide, thereby imparting adhesiveness, coating properties and the like to the polyolefin.

Methods for carrying out the graft reaction are divided broadly into two, the so-called solution method in which the reaction is carried out by using a solvent, and the so-called melt method in which reactants in a melted state are allowed to react. In the solution method, a large amount of a solvent is required, so that the production conducted by this method entails a high cost. Moreover, the use of a large amount of a solvent is also unfavorable from environmental point of view. On the other hand, no solvent is used in the melt method, so that this method is attracting attention as a simple and convenient method.

However, a modified polyolefin produced by the melt method contains a large amount of unreacted matters, that is, an ethylenically unsaturated compound such as a vinyl compound or an unsaturated carboxylic acid which has not been grafted to the polyolefin; oligomers, that is, low-molecular-weight polymers of an ethylenically unsaturated compound such as a vinyl compound or an unsaturated carboxylic acid; and other by-products. Due to such impurities, the modified polyolefin tends to have impaired adhesiveness, coating properties and printability. Moreover, there has been such a shortcoming in that these impurities form bubbles when the modified polyolefin is molded into a sheet, a film or the like.

There have been proposed, as methods for removing unreacted matters from a modified polyolefin, a dissolution/reprecipitation method (Japanese Laid-Open Patent Publication No. 99193/1979), a drying-by-heating method (Japanese Laid-Open Patent Publication No. 95914/1981), and a method in which a modified polyolefin is treated in warm or hot water under stirring (Japanese Laid-Open Patent Publication No. 118411/1981).

However, we consider that although these proposals may bring about some improvements, the improvements would be accompanied with some problems. Namely, in the dissolution/reprecipitation method, a large amount of a solvent such as acetone is used, and the operation of the method is also complicated. Therefore, this method would be a shortcoming of high production cost. The drying-by-heating method would be still unsatisfactory when the removal of unreacted matters is taken into consideration. Moreover, there is a shortcoming in that a modified polyolefin resin tends to be colored when it is dried by heating. The method in which a modified polyolefin is treated in warm or hot water under stirring would also be still unsatisfactory. This is because the removal of unreacted matters and oligomers from a modified polyolefin and the prevention of coloring of the modified polyolefin would not be fully attained by this method.

SUMMARY OF THE INVENTION

An object of the present invention is to overcome the aforementioned drawbacks in the prior art, thereby providing a method of after-treatment of modified polyolefins, useful for economically producing modified polyolefins which are excellent in adhesiveness and which are colored little, that is, a method for reducing the amount of unreacted unsaturated carboxylic acids or derivatives thereof and oligomers of such compounds contained in modified-polyolefins.

The above object of the invention will be attainable by a method of after-treatment of modified polyolefins, comprising the step of melt-kneading, in the presence of water, a modified polyolefin which is prepared by melt-kneading, under the graft reaction conditions, a mixture comprising a polyolefin, an ethylenically unsaturated carboxylic acid or its derivative and an organic peroxide, the amount of the water being 10 to 200 parts by weight for 100 parts by weight of the modified polyolefin.

BRIEF DESCRIPTION OF THE DRAWINGS

FIG. 1 is a diagrammatic sectional view of a twin-screw extruder for use in the after-treatment of a modified polyolefin which has been separately prepared by modifying a polyolefin.

FIG. 2 is a diagrammatic sectional view of a twin-screw extruder which is used to effect, as an undivided process, the modification of a polyolefin and the after-treatment of the modified polyolefin in one apparatus. The structure of this extruder is basically the same as that of the twin-screw extruder shown in FIG. 1; however, this extruder differs from the one shown in FIG. 1 in that it is provided with a kneading section to be used for the step of modifying a polyolefin.

DESCRIPTION OF PREFERRED EMBODIMENTS OF THE INVENTION

As mentioned previously, the present invention relates to a method of after-treatment of a modified polyolefin which is obtained by subjecting a melted polyolefin to graft polymerization with an ethylenically unsaturated compound.

The further treatment of the modified polyolefin according to the present invention can be effected in situ during the production of the modified polyolefin (the details will be explained later). Therefore, the "after-treatment" according to the present invention includes such an in situ treatment.

1. Production of Modified Polyolefin (1) Polyolefin

Examples of the polyolefin which can be used in the present invention as the "backbone" of a modified polyolefin to be produced by graft reaction include homopolymers of alpha-olefins having 2 to 8 carbon atoms such as ethylene, propylene, butene-1, hexene-1, 3-methylbutene-1, 4-methylpentene-1, heptene-1, octene-1 and decene-1; random or block copolymers of two or more of these alpha-olefins; random, block or graft polymers obtained by using as a main component an alpha-olefin having 2 or more carbon atoms, and other vinyl monomers; and mixtures of these polymers.

Specifically, propylene polymers comprising propylene as a main component, such as propylene homopolymer, propylene-ethylene copolymer, propylene-ethylene-butene-1 copolymer and propylene-4-methylpentene-1 copolymer; ethylene polymers comprising ethylene as a main component, such as low-density polyethylene, high-density polyethylene, linear low-density polyethylene, ethylene-propylene copolymer and ethylene-vinyl acetate copolymer; and poly(4-methylpentene-1), polybutene-1 and the like can be mentioned.

Of these polyolefins, preferable ones are ethylene polymers and propylene polymers, the latter being more preferable.

The melt flow rate (MFR) according to ASTM D 1238 of the polyolefin is as follows: in the case where an ethylene polymer is used as the polyolefin, it is preferable that the MFR thereof measured at a temperature of 190° C. under a load of 2.16 kg be in the range of 0.01 to 200 g/10 min, particularly in the range of 0.1 to 100 g/10 min; and in the case where a propylene polymer is used as the polyolefin, it is preferable that the MFR thereof measured at a temperature of 230° C. under a load of 2.16 kg be in the range of 0.1 to 200 g/10 min, particularly in the range of 0.2 to 100 g/10 min.

(2) Ethylenically Unsaturated Carboxylic Acid or Its Derivative

Examples of the ethylenically unsaturated carboxylic acid which is grafted onto the polyolefin as a "branch", preferably carboxylic acid of 3 to 10 carbon atoms, include acrylic acid, methacrylic acid, maleic acid, fumaric acid, itaconic acid and crotonic acid; and examples of derivatives of these unsaturated carboxylic acids include acid anhydrides, esters where the alcohol in the ester may, for example, be an alkanol of 1 to 10 carbon atoms which is unsubstituted or substituted with hydroxy or 1,2-epoxyethyl, amides, imides and inorganic salts, particularly alkali metal salts. Specifically, maleic anhydride, itaconic anhydride, citraconic anhydride, methyl acrylate, ethyl acrylate, methyl methacrylate, ethyl methacrylate, glycidyl acrylate, glycidyl methacrylate, 2-hydroxyethyl methacrylate, allyl methacrylate, acrylamide, methacrylamide, maleimide, sodium acrylate, sodium methacrylate, potassium acrylate and potassium methacrylate can be mentioned. Of these compounds, maleic anhydride is favorably used.

The ethylenically unsaturated carboxylic acid or its derivative is used in an amount of 0.1 to 20 parts by weight, preferably 0.2 to 10 parts by weight for 100 parts by weight of the above-described polyolefin. When less than 0.1 parts by weight of the ethylenically unsaturated carboxylic acid or its derivative is used, no modified polyolefin which is sufficient in adhesiveness and coating properties would be obtained. On the other hand, when more than 20 parts by weight of the ethylenically unsaturated carboxylic acid or its derivative is used, the resulting modified polyolefin would contain an unacceptably increased amount of unreacted matters and by-products. Due to such impurities, the modified polyolefin would have adhesiveness, coating properties and printability unacceptably impaired, and would also be unfavorably colored. It is, however, troublesome to effect an after-treatment for removing the impurities from the modified polyolefin.

It has been found that the graft efficiency of the ethylenically unsaturated carboxylic acid or its derivative onto the polyolefin backbone is improved when an aromatic vinyl compound is used along with it. Therefore, in the present invention, when it is described that the "ethylenically unsaturated carboxylic acid or its derivative" is used for the production of a modified polyolefin, this includes a case where an aromatic vinyl compound is also used along with the compound. Examples of such an aromatic vinyl compound include styrene and vinylnaphthalene, not substituted; and styrene and vinylnaphthalene whose nucleus and/or side chain is substituted with a lower alkyl group (in particular, a C1–C4 alkyl group), a lower alkoxy group, a halogen or the like, for instance, alpha-methylstyrene, alpha-methoxystyrene, methylstyrenes, dimethylstyrenes, 2,4,6-trimethylstyrene, chlorostyrenes, dichlorostyrenes, bromostyrenes, nitrostyrenes, chloromethylsytrenes, cyanostyrenes, and t-butylstyrenes. Of these compounds, styrene, alpha-methoxystyrene and methylstyrenes are preferred.

These aromatic vinyl compounds can be used either singly or in combination of two or more. In the case where any of these aromatic vinyl compounds is used, the amount thereof is preferably from 0.1 to 20 parts by weight, particularly from 0.2 to 10 parts by weight, for 100 parts by weight of the above-described polyolefin. Since the aromatic vinyl compound is used as an additive useful for improving the graft efficiency of the ethylenically unsaturated carboxylic acid or its derivative, it is usually used in an amount of equimolar to or less than that of the ethylenically unsaturated carboxylic acid or its derivative used.

(3) Organic Peroxide

A compound whose half-life period is one minute at a temperature (T1M) of 120° to 230° C., preferably 125° to 200° C., particularly 130° to 190° C., is suitable as the organic peroxide to be used to cause the graft reaction. Examples of such a compound include acetyl peroxide (T1M: 123° C.), succinic acid peroxide (T1M: 132° C.), benzoyl peroxide (T1M: 130° C.), m-toluoyl peroxide (T1M: 131° C.), t-butyl peroxy 2-ethylhexanoate (T1M: 134° C.), t-butyl peroxyisobutyrate (T1M: 136° C.), 1,1-bis(t-butylperoxy)cyclohexane (T1M: 149° C.), t-butyl peroxyisopropyl carbonate (T1M: 159° C.), 2,2-bis(t-butylperoxy)octane (T1M: 159° C.), t-butyl peroxyacetate (T1M: 160° C.), 2,5-dimethyl-2,5-di(benzoylperoxy)hexane (T1M: 158° C.), t-butyl peroxylaurate (T1M: 159° C.), di-t-butyl peroxyisophthalate (T1M: 167° C.), t-butyl peroxybenzene (T1M: 167° C.), dicumyl peroxide (T1M: 173° C.),alpha, alpha'-bis(t-butylperoxy-m-isopropyl)benzene (T1M: 175° C.), t-butyl cumylperoxide (T1M: 173° C.), 2,5-dimethyl-2,5-di(t-butylperoxy)hexane (T1M: 180° C.), di-t-butyl peroxide (T1M: 186° C.) and 2,5-dimethyl-2,5-di(t-butylperoxy)hexyne-3 (T1M: 194° C.). These organic peroxides can be used either singly or in combination of two or more.

It is suitable that the organic peroxide be used in an amount of 0.01 to 20 parts by weight, preferably 0.1 to 15 parts by weight, particularly 0.5 to 10 parts by weight, for 100 parts by weight of the above-described polyolefin.

(4) Production of Modified Polyolefin

A modified polyolefin to be subjected to the after-treatment of the present invention can be produced by melt-kneading a mixture of the above-described polyolefin, ethylenically unsaturated carboxylic acid or its derivative and organic peroxide under the graft reaction conditions.

The modified polyolefin is a mixture consisting of (i) the polyolefin having the ethylenically unsaturated carboxylic acid or its derivative grafted thereonto; (ii) the polyolefin which has no ethylenically unsaturated carboxylic acid or its derivative grafted thereonto; (iii) the ethylenically unsaturated carboxylic acid or its derivative which has not been reacted with or grafted onto the polyolefin; (iv) oligomers including from dimers to low-molecular-weight polymers having molecular weights of 10,000 or less of the ethylenically unsaturated carboxylic acid or its derivative which has not grafted onto the polyolefin; and (v) other by-products.

Any conventional melt-kneading machine such as a single- or twin-screw extruder, a Banbury mixer, mixing rolls or a Brabender Plastograph can be used as the apparatus in which the graft reaction of the above-described mixture is carried out by melt-kneading. A suitable kneading temperature is in the range of 160° to 260° C. When the kneading temperature is too low, there is a tendency that the organic peroxide is not fully decomposed. On the other hand, when the kneading temperature is excessively high, the thermal decomposition reaction or crosslinking reaction of the polyolefin tends to proceed preferentially. Thus, there is a tendency that the desired modification of the polyolefin would not be fully attained in either case. The melt-kneading machine used for the melt-kneading grafting can be provided with a means for discharging low-boiling-point products which may be produced in the course of the melt-kneading, such as a vent.

The amount of the ethylenically unsaturated carboxylic acid or its derivative grafted onto the polyolefin by the above-described graft modification, which is measured by an infrared spectrophotometer, is preferably from 0.01 to 10% by weight, more preferably from 0.05 to 7% by weight, particularly from 0.1 to 5% by weight.

When less than 0.01% by weight of the ethylenically unsaturated carboxylic acid or its derivative is grafted onto the polyolefin, the resulting modified polyolefin may have no adhesiveness fully improved. On the other hand, when more than 10% by weight of the ethylenically unsaturated carboxylic acid or its derivative is grafted onto the polyolefin, the polyolefin may be partially crosslinked in the course of the graft reaction, and therefore, the resulting modified polyolefin tends to have impaired moldability and poor appearance due to fish eyes, lumps or the like and poor adhesiveness also.

2. After-Treatment of Modified Polyolefin

The after-treatment of modified polyolefins according to the present invention comprises the step of melt-kneading the modified polyolefin thus obtained in the presence of water. By this treatment, it is possible to reduce the amount of "impurities" contained in the modified polyolefin, such as the ethylenically unsaturated carboxylic acid or its derivative which has not been reacted with the polyolefin, and oligomers which are low-molecular weight polymers of the ethylenically unsaturated carboxylic acid or its derivative.

The method for melt-kneading the modified polyolefin in the presence of water specifically comprises the step of kneading the modified polyolefin which has been melted in the presence of, for example, 10 to 200 parts by weight, preferably 20 to 100 parts by weight, of water to 100 parts by weight of the modified polyolefin until the desired reduction of the impurity content is attained. When less than 10 parts by weight of water is added, the amount of the unreacted matters and oligomers contained in the modified polyolefin may not be fully reduced. On the other hand, when more than 200 parts by weight of water is supplied, the temperature of the kneading section of the melt-kneading machine drops excessively, so that the kneading effects may not be fully obtained, and at the lowered temperature the amount of heat may not be enough to vaporize the water, whereby the water from the mixture may be removed with some difficulty.

Since the melting point of the modified polyolefin is, in general, higher than 100° C., the melt-kneading of the modified polyolefin, which is conducted in the presence of water, may be required to be effected under pressure. Further, it is understood that the "purification" of the modified polyolefin according to the present invention is attained when the impurities or decomposition products thereof are removed from the modified polyolefin by being accompanied by water vapor generated (the present invention is not bound to this theory). Therefore, there may be generally used in the present invention a pressure heating apparatus whose structure is such that the water can be discharged as water vapor from the kneading section thereof after the melt-kneading of the modified polyolefin is conducted. In order to conduct the after-treatment continuously, it is preferable that the apparatus be an extruder; in general, an extruder provided with a vent port at the extrusion head and/or barrel thereof is preferred. Typically, a conventional melt-kneading machine having a vent port, for instance, a single- or twin-screw extruder, a Banbury mixer, a mixing roll, a Brabender Plastograph or the like can be used for the after-treatment. Of these apparatuses, a twin-screw extruder is preferred. The kneading temperature at which the after-treatment is effected is from 140° to 260° C., preferably from 160° to 200° C.; and the kneading time is preferably from 0.5 to 30 minutes, particularly from 1 to 10 minutes.

Water is supplied to the extruder or the like in the following manner: water pressurized by a pump is supplied to the extruder from a water-supply port provided on the kneading section of the extruder.

The water which has been utilized in the after-treatment and then vaporized (water vapor) is discharged along with volatile unreacted matters from the vent port. The water is thus separated from the modified polyolefin having undergone the after-treatment. From the viewpoint of easiness of the supply and discharge of water, a twin-screw extruder is preferred as the melt-kneading machine.

In general, a twin-screw extruder is composed of a shaft, a screw element mounted on the shaft and a cylinder, and the characteristics of the extruder vary depending upon the L/D ratio (L: screw length; D: screw diameter), the direction of rotation of the screws (the same direction (the co-rotating), the counter direction (the counter-rotating)), and the type of engagement of the screws (the separation type, the contact type, the partial-engagement type, the complete-engagement type).

A twin-screw extruder suitable as the melt-kneading machine for use in the method of the present invention is one whose L/D ratio is from 10 to 100, preferably from 20 to 70 and in which two screws rotate in the same direction and engage each other partially or completely.

The apparatus suitable for effecting the present invention is a melt-kneading machine useful for processing thermoplastic resins. Therefore, this apparatus can be basically the same as the apparatus which is used for producing the modified polyolefin by means of melt-kneading grafting.

It is clear that the production of a modified polyolefin by means of melt-kneading grafting and the after-treatment of the modified polyolefin effected in the presence of water according to the present invention, can be conducted at the same time because there are similarities between the conditions under which they are conducted, and/or the apparatus to be used for them. Therefore, as mentioned previously, the present invention includes such an embodiment that the after-treatment of a modified polyolefin is conducted in situ during the production of the modified polyolefin.

In order to effect the melt-kneading grafting to obtain a modified polyolefin and the after-treatment of the modified polyolefin in one apparatus, it is preferable, rather than to effect the grafting step as a complete in situ operation, to directly connect the grafting step upstream to the after-treatment step, thereby effecting the after-treatment as in fact an after-treatment of the melt-kneading grafting.

On such premises, the twin-screw extruder for use in the method of the present invention will now be explained by referring to the accompanying drawings.

The apparatus shown in FIG. 1 is a diagrammatic sectional view of the twin-screw extruder for use in the after-treatment of a modified polyolefin which has been separately prepared by modifying a polyolefin.

The extruder is essentially consisting of a cylinder 2, a shaft 3 and a screw element 4. The screw element 4 is composed of a transport element (screw bushing) 4a and a kneading element 4b.

A modified polyolefin which is intended to be subjected to the after-treatment is fed to the extruder from a feed opening 11, and water is supplied from a water-supply port 12 to effect melt-kneading. Water vapor generated in the course of the melt-kneading is discharged from a vent port 13 along with volatile unreacted matters. After this after-treatment is completed, the modified polyolefin from which unreacted matters have been removed is extruded from an extrusion head 14 through an extrusion die 15, and then subjected to cutting or grinding into pellets of the modified polyolefin.

In this case, the twin-screw extruder is composed of transport section 21, kneading section 22, transport section 21, venting section 23, transport section 21, venting section 23 and transport section 21 arranged in the mentioned order.

It is noted that the vent port 13 can be either a simple opening or an opening which is connected to a vacuum pump so as to reduce the pressure. Further, the extruder can be provided with either one vent port 13 or a plurality of vent ports 13.

As mentioned previously, this after-treatment can be effected not only after the production of a modified polyolefin but also by being directly connected to the production of a modified polyolefin, that is, the step of melt-kneading a mixture of a polyolefin, an ethylenically unsaturated carboxylic acid or its derivative and an organic peroxide under the graft reaction conditions. In other words, this is a method in which the melt modification of a polyolefin and the after-treatment of the modified polyolefin, which is effected in the presence of water, are conducted in one apparatus.

The apparatus shown in FIG. 2 is a diagrammatic sectional view of a twin-screw extruder which is used for conducting, as an undivided process, both the modification of a polyolefin and the after-treatment of the modified polyolefin in one apparatus. The structure of this extruder is basically the same as that of the twin-screw extruder shown in FIG. 1; however, this extruder differs from the one shown in FIG. 1 in that it is provided with a kneading section for the step of modifying a polyolefin.

In such an undivided process, a polyolefin, an ethylenically unsaturated carboxylic acid or its derivative and an organic peroxide are fed to the extruder from a feed opening 11, and kneaded to obtain a modified polyolefin. Some of unreacted matters are discharged from a vent port 13A. Subsequently, water is supplied from a water-supply port 12, and the mixture is kneaded so that the modified polyolefin will undergo the after-treatment. Water vapor and unreacted matters are discharged from a vent port 13B. After this after-treatment is completed, the modified polyolefin from which unreacted matters have substantially been removed is extruded from an extrusion head 14 through an extrusion die 15, and then subjected to cutting or grinding into pellets of the modified polyolefin.

In this case, the twin-screw extruder is composed of transport section 21, kneading section 22, venting section 23, kneading section 22, transport section 21, venting section 23, transport section 21, venting section 23 and transport section 21 arranged in the mentioned order.

It is noted that the vent ports 13A and 13B can be either simple openings or openings which are connected to a vacuum pump so as to reduce the pressure. Further, the extruder can be provided with either one vent port 13B or a plurality of vent ports 13B.

When the melt-kneading is conducted in the after-treatment step, an antioxidant can be incorporated so as to prevent the thermal oxidative degradation of the modified polyolefin, which may be caused in the course of the melt-kneading, within such a range that the advantages of the present invention are not impaired. The amount of the antioxidant used is preferably from 0.01 to 2 parts by weight, particularly from 0.1 to 1 part by weight for 100 parts by weight of the modified polyolefin to undergo the after-treatment.

Examples of such an antioxidant include radical scavengers such as 2,6-di-t-butyl-4-methylphenol, 2,2'-methylene-bis-(4-methyl-6-t-butylphenol), 4,4'-butylidene-bis-(3-methyl-6-t-butylphenol), 4,4'-thiobis-(3-methyl-6-t-butylphenol), octadecyl-3-(3,5-t-butyl-4-hydroxyphenyl) propionate, tetrakis-[methylene-3-(3',5'-di-t-butyl-4'-hydroxyphenyl)propionate]-methane, 6-(3,5-di-t-butyl-4-hydroxyanilino)-2,4-bis-octylthio-1,3,5-triazine, tris-(3,5-di-t-butyl-4-hydroxybenzyl)-isocyanurate and tris-(4-t-butyl-2,6-dimethyl-3-hydroxybenzyl)-isocyanurate, and decomposers for peroxides such as di-laury-thio-di-propionate, di-stearyl-thio-di-propionate and tris-nonylphenyl-phosphite. These antioxidants can be used either singly or in combination of two or more.

By the method of after-treatment according to the present invention, the amount of the ethylenically unsaturated carboxylic acid or its derivative which has not been reacted with the polyolefin and oligomers which are low-molecular-weight polymers of the ethylenically unsaturated carboxylic acid or its derivative contained in the modified polyolefin can be reduced at a rate of reduction of 5 to 100%, where the rate of reduction is:

[(the amount of unreacted matters contained in a modified polyolefin before subjected to the after-treatment)—(the amount of unreacted matters contained in the modified polyolefin after subjected to the after-treatment)]/(the amount of unreacted matters contained in the modified polyolefin before subjected to the after-treatment)

EXAMPLES

The present invention will now be explained more specifically by referring to the following Examples and Comparative Examples.

(A) Evaluation Methods (1) Amount of Ethylenically Unsaturated Carboxylic Acid or Its Derivative (i) Maleic anhydride Pellets of a sample resin were made into a film having a thickness of approximately 100 micrometers by means of hot press molding under the conditions of 200° C. and 100 kg/cm²G. This film was subjected to infrared spectroscopic analysis, and the amount of maleic anhydride was determined from the peak at 1780 cm⁻¹ of the infrared absorption spectra obtained. This value was regarded as the total amount of maleic anhydride.

Pellets of the sample resin were subjected to acetone extraction for 6 hours, and then dried in vacuo at 50° C. for 24 hours. The amount of maleic anhydride contained in the resin thus treated was determined in the same manner as in the above. This value was regarded as the amount of maleic anhydride grafted. Further, the value obtained by subtracting the amount of maleic anhydride grafted from the total amount of maleic anhydride was regarded as the amount of remaining unreacted maleic anhydride.

(ii) Glycidyl methacrylate

The amount of glycidyl methacrylate grafted was determined in the same manner as in the case of maleic anhydride except that the peak at 1724 cm⁻¹ of the infrared absorption spectra obtained was used for the determination.

(iii) 2-Hydroxyethyl methacrylate

The amount of grafted 2-hydroxyethyl methacrylate was determined in the same manner as in the case of maleic anhydride except that the peak at 1724 cm⁻¹ of the infrared absorption spectra obtained was used for the determination.

(2) Hue

The tristimulus values, X, Y and Z, of a sample sheet having a thickness of 2 mm, prepared by molding were determined by using a color tester in accordance with JIS K7103, and the YI value, one of the indices of yellowness, was calculated from the following equation:

$$YI = (100/Y)(1.28X - 1.06Z)$$

When the YI value is greater, the sample film has been colored to a higher degree.

(3) Evaluation of Adhesiveness 10 parts by weight of a modified polyolefin was mixed with 90 parts by weight of an unmodified polyolefin, and the mixture was molded into a sheet having a thickness of 0.5 mm and dimensions of 20 cm×20 cm by using a hot press. This sheet was placed on a nylon 6 film or aluminum foil having a thickness of 0.5 mm, and hot-pressed again to obtain composite sheets each having a thickness of 1 mm.

A test piece having a width of 1 cm and a length of 12 cm was made from each composite sheet, and the adhesion strength between the modified polyolefin and the nylon 6 film or the aluminum foil was measured. The measurement was conducted by using an Instron tester with a stress rate of 50 mm/min.

(B) Production of Modified Polyolefin

A mixture of 100 parts by weight of a propylene homopolymer having an MFR of 1.0 g/10 min, 5 parts by weight of maleic anhydride, and 3.0 parts by weight of an organic peroxide, benzoyl peroxide ("Niper BMT" manufactured by NIPPON YUSHI, K.K. Japan, T1M=130° C.), was fed at a feed rate of 6.0 kg/hour to a twin-screw extruder ("TEX 30 SST" manufactured by NIPPON SEIKOSHO, K.K., Japan, screw diameter: 30 mm, L/D: 42) having screws rotating in the same direction, the temperature of the extruder being adjusted to 160° C., the screw speed being set at 150 rpm, and the mixture was melt-kneaded. The melted resin was extruded from the extrusion die of the extruder to obtain a strand. The strand was then subjected to cutting to obtain pellets of the modified polyolefin (modified PO-1).

In the same manner as in the above, pellets of the modified polyolefins (modified PO-2 to modified PO-7) were obtained in accordance with the formulations shown in Table 1.

TABLE 1

| | Polyolefin (Note 2) | | Ethylenically Unsaturated Carboxylic Acid or Its Derivative (Note 2) | | Organic Peroxide | | | Kneading | Amount | Amount |
|---|---|---|---|---|---|---|---|---|---|---|
| Modified PO | Type | MFR (g/10 min) | Type | Amount (Note 1) | Type | Amount (Note 1) | T1M (°C.) | Temperature (°C.) | Grafted (wt. %) | Unreacted (wt. %) |
| PO-1 | PP | 1.0 | MAH | 5.0 | BMT | 3.0 | 130 | 160 | 0.78 | 3.00 |
| PO-2 | PP | 1.0 | MAH | 5.0 | 25B | 3.0 | 180 | 200 | 1.66 | 2.14 |
| PO-3 | PE | 2.8 | MAH | 5.0 | BMT | 3.0 | 130 | 160 | 0.87 | 2.87 |
| PO-4 | EPP | 1.8 | MAH | 5.0 | BMT | 3.0 | 130 | 160 | 0.88 | 3.14 |
| PO-5 | PP | 1.0 | GMA | 5.0 | BMT | 3.0 | 130 | 160 | 0.90 | 1.10 |
| PO-6 | PP | 1.0 | HEMA | 5.0 | Z | 3.0 | 167 | 200 | 1.80 | 1.70 |
| PO-7 | PP | 1.0 | HEMA/SM | 5.0/5.0 | Z | 3.0 | 167 | 200 | 1.90 | 1.70 |

(Note 1) The amount incorporated is expressed in parts by weight for 100 parts by weight of the polyolefin.
(Note 2) The starting materials used in Examples:
Polyolefin:
PP: Propylene homopolymer
PE: Polyethylene (density: 0.925 g/cm³)
EPF: Ethylene-propylene random copolymer (ethylene content: 3.2% by weight)
Ethylenically unsaturated carboxylic acid or its derivative, etc.:
MAH: Maleic anhydride
GMA: Glycidyl methacrylate
HEMA: 2-Hydroxyethyl methacrylate
SM: Styrene
Organic peroxide:
BMT: Benzoyl peroxide ("Niper BMT" manufactured by NIPPON YUSHI, K.K.)
25B: 2,5-Dimethyl-2,5-di(t-butylperoxy)-hexane ("Perhexa 25B" manufactured by NIPPON YUSHI, K.K.)
Z: t-Butyl peroxybenzene ("Perbutyl Z" manufactured by NIPPON YUSHI, K.K.)

[Example 1]

A mixture consisting of 100 parts by weight of the modified PO-1 as a modified polyolefin, and, as antioxidants, 0.1 parts by weight of tetrakis-[methylene-3-(3',5'-di-t-butyl-4'-hydroxyphenyl)-propionate]methane and 0.1 parts by weight of tris-(4-t-butyl-2,6-dimethyl-3-hydroxybenzyl)isocyanurate was fed at a feed rate of 3.0 kg/hour to a twin-screw extruder ("TEX 30 SST" manufactured by NIPPON SEIKOSHO, K.K., screw diameter: 30 mm, L/D: 42) having screws rotating in the same direction, the temperature of the extruder being adjusted to 160° C., the screw rotation being set at 150 rpm. At the same time, water was supplied to the extruder from the water-supply port provided to the mixing section of the extruder at a rate of 3.0 kg/hour by using a pressure pump. The after-treatment of the above modified polyolefin was thus effected. While venting unreacted matters along with water vapor from the vent port, the extrusion of the melted resin from the extrusion die of the extruder was conducted to give a strand. The strand was then subjected to cutting to give pellets of the modified polyolefin which had undergone the after-treatment (after-treated PO-1). This after-treated PO-1 was subjected to the evaluation. The results are shown in Table 2.

Thereafter, 90 parts by weight of an unmodified propylene-ethylene random copolymer (MFR: 0.6 g/10 min, ethylene content: 3.9% by weight) was blended with 10 parts by weight of the after-treated PO-1. By using this mixture, the adhesiveness was evaluated by the above-described method. The results are shown in Table 2.

[Examples 2 to 9 and Comparative Examples 1 to 17]

The modified polyolefins shown in Tables 2 and 3 were respectively subjected to the after-treatment in the same manner as in Example 1. The after-treated polyolefins were subjected to the evaluation. The results are shown in Tables 2 and 3.

[Comparative Example 18]

10 parts by weight of the modified PO-1 was used as a modified polyolefin. This was mixed with 100 parts by weight of boiling water by stirring for 6 hours. The modified polyolefin which had thus undergone "after-treatment" was subjected to the evaluation. The results are shown in Table 3.

[Example 10]

A mixture consisting of 100 parts by weight of a propylene homopolymer having an MFR of 1.0 g/10 min, 5 parts by weight of maleic anhydride, and 3 parts by weight of an organic peroxide, benzoyl peroxide ("Niper BMT" manufactured by NIPPON YUSHI, K.K., T1M=130° C.), was fed at a feed rate of 6.0 kg/hour to a twin-screw extruder ("TEX 30 SST" manufactured by NIPPON SEIKOSHO, K.K., screw diameter: 30 mm, L/D: 42) having screws rotating in the same direction, the temperature of the extruder being adjusted to 160° C., the screw rotation being set at 150 rpm. At the same time, water was supplied to the extruder from the water-supply port provided to the kneading section of the extruder at a rate of 2.0 kg/hour by using a pressure pump. The production of a modified polyolefin and the after-treatment of the modified polyolefin were thus effected in one extruder. While unreacted matters was vented along with water vapor from the vent port of the extruder, the extrusion of the melted resin from the extrusion die of the extruder was conducted to give a strand. The strand was then subjected to cutting to give pellets of the modified polyolefin which had been modified and after-treated in the undivided process (modified PO-T). This after-treated modified PO-T was subjected to the evaluation. The results are shown in Table 2.

Thereafter, 90 parts by weight of an unmodified propylene-ethylene random copolymer (MFR: 0.6 g/10 min, ethylene content: 3.9% by weight) was blended with 10 parts by weight of the above-obtained after-treated modified PO-T. By using this mixture, the adhesiveness was evaluated in the same manner as in Example 1. The results are shown in Table 2.

[Comparative Example 19]

A mixture consisting of 100 parts by weight of a propylene homopolymer having an MFR of 1.0 g/10 min, 5 parts by weight of maleic anhydride, 3 parts by weight of an organic peroxide, benzoyl peroxide ("Niper BMT" manufactured by NIPPON YUSHI, K.K., T1M=130° C.), and 2 parts by weight of water was fed at a feed rate of 6.0 kg/hour to a twin-screw extruder ("TEX 30 SST" manufactured by NIPPON SEIKOSHO, K.K., screw diameter: 30 mm, L/D: 42) having screws rotating in the same direction, the temperature of the extruder being adjusted to 160° C., the screw rotation being set at 150 rpm, and the mixture was melt-kneaded. The melted resin was extruded from the extrusion die of the extruder to give a strand. The strand was then subjected to cutting to obtain pellets of the modified polyolefin (modified PO-8).

Thereafter, 90 parts by weight of an unmodified propylene-ethylene random copolymer (MFR: 0.6 g/10 min, ethylene content: 3.9% by weight) was blended with 10 parts by weight of the above-obtained modified PO-8. By using this mixture, the adhesiveness was evaluated in the same manner as in Example 1. The results are shown in Table 3.

[Comparative Example 20]

The procedure of Comparative Example 19 was repeated except that the amount of water to be supplied was changed from 2 parts by weight to 10 parts by weight, thereby obtaining a modified polyolefin (modified PO-9). This modified polyolefin was subjected to the evaluation. The results are shown in Table 3.

TABLE 2

| | | | | | Physical Properties | | | | | |
|---|---|---|---|---|---|---|---|---|---|---|
| | | After-Tratment | | | Amount of Ethylenically Unsaturated Carboxylic Acid or Its Derivative Contained in Modified Poliolefin | | | | | |
| | | | Conditions, etc. | | | After-Treated | | | | |
| | | | Rate of Feed | Rate of Water | Total | Amount | Amount | | Adhessiveness | |
| Example | Modified Polyolefin | Manner | of Resin (kg/hour) | Supply (kg/hour) | Amount (wt. %) | Grafted (wt. %) | Unreacted (wt. %) | Hue YI | Nylon 6 (kg/cm) | Aluminium (kg/cm) |
| 1 | PO-1 | 1* | 3.0 | 3.0 | 1.08 | 0.70 | 0.38 | 35 | 2.1 | 1.9 |
| 2 | PO-1 | 1* | 3.0 | 1.0 | 1.25 | 0.72 | 0.53 | 36 | 2.0 | 1.9 |
| 3 | PO-1 | 1* | 3.0 | 0.3 | 1.59 | 0.72 | 0.87 | 39 | 1.9 | 1.7 |
| 4 | PO-2 | 1* | 3.0 | 1.0 | 1.80 | 1.55 | 0.25 | 39 | 2.0 | 1.8 |

TABLE 2-continued

| | | | After-Tratment | | Physical Properties | | | | | |
| | | | | | Amount of Ethylenically Unsaturated Carboxylic Acid or Its Derivative Contained in Modified Poliolefin | | | | | |
| | | | Conditions, etc. | | After-Treated | | | | Adhessiveness | |
| Example | Modified Polyolefin | Manner | Rate of Feed of Resin (kg/hour) | Rate of Water Supply (kg/hour) | Total Amount (wt. %) | Amount Grafted (wt. %) | Amount Unreacted (wt. %) | Hue YI | Nylon 6 (kg/cm) | Aluminium (kg/cm) |
|---|---|---|---|---|---|---|---|---|---|---|
| 5 | PO-3 | 1* | 3.0 | 1.0 | 1.13 | 0.65 | 0.48 | 33 | 1.8 | 1.6 |
| 6 | PO-4 | 1* | 3.0 | 1.0 | 1.50 | 0.86 | 0.64 | 38 | 2.3 | 2.0 |
| 7 | PO-5 | 1* | 3.0 | 1.0 | 1.23 | 0.90 | 0.33 | 12 | 1.7 | 1.5 |
| 8 | PO-6 | 1* | 3.0 | 1.0 | 2.08 | 1.80 | 0.28 | 8 | 1.8 | 1.6 |
| 9 | PO-7 | 1* | 3.0 | 1.0 | 2.35 | 1.90 | 0.45 | 8 | 2.4 | 2.5 |
| 10 | PO-T | 2* | 6.0 | 2.0 | 1.25 | 0.67 | 0.58 | 30 | 1.8 | 1.7 |

1*: Melt-kneading in the presence of water
2*: Conducting modification and after-treatment as undivided process
(Note) When the melt-kneading was conducted, 0.1 parts by weight of tetrakis-[methylene-3-(3',5'-di-t-butyl-4'-hydroxyphenyl)propionate] methane, and 0.1 parts by weight of tris-(4-t-butyl-2,6-dimethyl-3-hydroxybenzyl)isocyanurate were incorporated as antioxidants for 100 parts by weight of the modified polyolefin.

TABLE 3

| | | After-Tratment | | Physical Properties | | | | | |
| | | | | Amount of Ethylenically Unsaturated Carboxylic Acid or Its Derivative Contained in Modified Polyolefin After-Treated | | | | | |
| | | | | Total | Amount | Amount | | Adhessiveness | |
| Comparative Example | Modified Polyolefin | Manner | Conditions, etc. | Amount (wt. %) | Grafted (wt. %) | Unreacted (wt. %) | Hue YI | Nylon 6 (kg/cm) | Aluminium (kg/cm) |
|---|---|---|---|---|---|---|---|---|---|
| 1 | PO-1 | No treatment | — | 3.78 | 0.78 | 3.00 | 37 | 0.5 | 0.6 |
| 2 | PO-1 | Drying by heating | Drying at 100° C. for 6 hours | 1.39 | 0.76 | 0.63 | 46 | 1.3 | 1.1 |
| 3 | PO-1 | Drying by heating | Drying at 100° C. for 3 hours | 1.56 | 0.77 | 0.79 | 41 | 1.0 | 0.9 |
| 4 | PO-1 | Drying by heating | Drying at 60° C. for 12 hours | 1.88 | 0.77 | 1.11 | 40 | 1.1 | 0.9 |
| 5 | PO-2 | No treatment | — | 3.80 | 1.66 | 2.14 | 41 | 0.5 | 0.9 |
| 6 | PO-2 | Drying by heating | Drying at 100° C. for 6 hours | 2.09 | 1.64 | 0.45 | 51 | 1.2 | 1.0 |
| 7 | PO-3 | No treatment | — | 3.74 | 0.87 | 2.87 | 34 | 0.4 | 0.4 |
| 8 | PO-3 | Drying by heating | Drying at 100° C. for 6 hours | 1.27 | 0.67 | 0.60 | 38 | 1.4 | 1.3 |
| 9 | PO-4 | No treatment | — | 4.02 | 0.88 | 3.14 | 39 | 0.7 | 0.7 |
| 10 | PO-4 | Drying by heating | Drying at 100° C. for 6 hours | 1.53 | 0.87 | 0.66 | 51 | 1.6 | 1.4 |
| 11 | PO-5 | No treatment | — | 2.00 | 0.90 | 1.10 | 12 | 0.3 | 0.4 |
| 12 | PO-5 | Drying by heating | Drying at 100° C. for 6 hours | 1.29 | 0.88 | 0.41 | 15 | 1.0 | 0.8 |
| 13 | PO-6 | No treatment | — | 3.50 | 1.80 | 1.70 | 8 | 0.3 | 0.3 |
| 14 | PO-6 | Drying by heating | Drying at 100° C. for 6 hours | 2.19 | 1.74 | 0.45 | 10 | 0.9 | 1.0 |
| 15 | PO-7 | No treatment | — | 3.60 | 1.90 | 1.70 | 7 | 0.7 | 0.9 |
| 16 | PO-7 | Drying by heating | Drying at 100° C. for 6 hours | 2.33 | 1.88 | 0.45 | 8 | 1.5 | 1.7 |
| 17 | PO-1 | 1* | Modified PO 3.0 kg/hour Water 0.1 kg/hour | 3.44 | 0.74 | 2.70 | 40 | 1.5 | 1.4 |
| 18 | PO-1 | 3* | Boiling 6 hours | 2.73 | 0.77 | 1.96 | 37 | 0.9 | 0.8 |
| 19 | PO-8 | No treatment | — | 3.29 | 0.44 | 2.85 | 35 | 0.3 | 0.3 |
| 20 | PO-9 | No treatment | — | 3.14 | 0.32 | 2.82 | 36 | 0.2 | 0.2 |

1*: Melt-kneading in the presence of water
3*: Mixing by stirring in the presence of water
(Note) When the melt-kneading was conducted, 0.1 parts by weight of tetrakis-[methylene-3-(3',5'-di-t-butyl-4'-hydroxyphenyl)propionate]methane, and 0.1 parts by weight of tris-(4-t-butyl-2,6-dimethyl-3-hydroxybenzyl)isocyanurate were incorporated as antioxidants for 100 parts by weight of the modified polyolefin.

What is claimed is:

1. A method of after-treatment of modified polyolefins comprising the step of melt-kneading by means of a twin-screw extruder in which two screws rotate in the same direction and engage each other partially or completely, in the presence of water, a modified polyolefin which is prepared by melt-kneading, under the graft reaction conditions, a mixture comprising a polyolefin, an ethylenically unsaturated carboxylic acid or its derivative and an organic peroxide, the amount of the water being from 10 to 200 parts by weight for 100 parts by weight of the modified polyolefin.

2. A method of after-treatment of modified polyolefins comprising the step of melt-kneading by means of a twin-screw extruder in which two screws rotate in the same direction and engage each other partially or completely, in a melt kneading machine having a vent port, in the presence of water, a modified polyolefin which is prepared by melt-kneading, under the graft reaction conditions, a mixture comprising a polyolefin, an ethylenically unsaturated carboxylic acid or its derivative and an organic peroxide, the amount of the water being from 10 to 200 parts by weight for 100 parts by weight of the modified polyolefin, water vapor generated in the course of the melt-kneading of the modified polyolefin being vented from the vent port.

3. The method of after-treatment of modified polyolefins according to claim 1, wherein the polyolefin is at least one polyolefin selected from ethylene polymers and propylene polymers.

4. The method of after-treatment of modified polyolefins according to claim 3, wherein the polyolefin is a propylene polymer.

5. The method of after-treatment of modified polyolefins according to claim 1, wherein the ethylenically unsaturated carboxylic acid or its derivative is at least one compound selected from the group consisting of maleic anhydride, 2-hydroxyethyl methacrylate and glycidyl methacrylate.

6. The method of after-treatment of modified polyolefins according to claim 1, wherein the ethylenically unsaturated carboxylic acid or its derivative is maleic anhydride.

7. The method of after-treatment of modified polyolefins according to claim 1, wherein the modified polyolefin is melt-kneaded in the presence of water at a temperature of 140° to 260° C.

8. The method of after-treatment of modified polyolefins according to claim 1, wherein the modified polyolefin has a graft rate of 0.01 to 10%.

9. The method of after-treatment of modified polyolefins according to claim 1, wherein the modified polyolefin is one prepared by melt-kneading, under the graft reaction conditions, a mixture consisting of 100 parts by weight of a polyolefin, 0.1 to 20 parts by weight of an ethylenically unsaturated carboxylic acid or its derivative and 0.01 to 20 parts by weight of an organic peroxide.

10. The method of after-treatment of modified polyolefins according to claim 1, wherein the organic peroxide is one whose half-life period is one minute at a temperature of 120° to 230° C.

11. The method of after-treatment of modified polyolefins according to claim 1, wherein 0.01 to 2 parts by weight of an antioxidant is compounded for 100 parts by weight of the modified polyolefin when the modified polyolefin is melt-kneaded in the presence of water.

12. A method of after-treatment of modified polyolefins comprising the step of melt-kneading by means of a twin-screw extruder in which two screws rotate in the same direction and engage each other partially or completely, in the presence of water, a modified polyolefin which is prepared by melt-kneading, under the graft reaction conditions, a mixture comprising a polyolefin, an ethylenically unsaturated carboxylic acid or its derivative and an organic peroxide, the amount of the water being from 10 to 200 parts by weight for 100 parts by weight of the modified polyolefin, thereby reducing 5 to 100% of the amount of the ethylenically unsaturated carboxylic acid or its derivative which has not been reacted with the polyolefin and oligomers which are low-molecular weight polymers of the ethylenically unsaturated carboxylic acid or its derivative contained in the modified polyolefin.

13. A method of after-treatment of modified polyolefins comprising the step of melt-kneading by means of a twin-screw extruder in which two screws rotate in the same direction and engage each other partially or completely, in the presence of water, a modified polyolefin which is prepared by melt-kneading, under the graft reaction conditions, a mixture comprising a polyolefin, an ethylenically unsaturated carboxylic acid or its derivative, an aromatic vinyl compound in an amount no higher than that of the ethylenically unsaturated carboxylic acid or its derivative and an organic peroxide, the amount of the water being from 10 to 200 parts by weight for 100 parts by weight of the modified polyolefin.

14. A method of after-treatment of modified polyolefins comprising the steps of melt-kneading by means of a twin-screw extruder in which two screws rotate in the same direction and engage each other partially or completely, under the graft reaction conditions, a mixture comprising a polyolefin, an ethylenically unsaturated carboxylic acid or its derivative and an organic peroxide to obtain a modified polyolefin, and melt-kneading the modified polyolefin in presence of water in a melt-kneading machine having a vent port, while venting from the vent port water vapor generated, thereby after-treating the modified polyolefin, the amount of water being from 10 to 200 parts by weight for 100 parts by weight of the modified polyolefin, wherein the step of modifying the polyolefin and the step of after-treating the modified polyolefin are effected in one melt-kneading machine having a vent port.

* * * * *